US009189422B2

(12) United States Patent
Shivashankaraiah et al.

(10) Patent No.: US 9,189,422 B2
(45) Date of Patent: Nov. 17, 2015

(54) METHOD TO THROTTLE RATE OF DATA CACHING FOR IMPROVED I/O PERFORMANCE

(71) Applicant: LSI CORPORATION, San Jose, CA (US)

(72) Inventors: Vinay Bangalore Shivashankaraiah, Bangalore (IN); Netra Gopinath, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 256 days.

(21) Appl. No.: 13/761,397

(22) Filed: Feb. 7, 2013

(65) Prior Publication Data

US 2014/0223106 A1 Aug. 7, 2014

(51) Int. Cl.
*G06F 12/00* (2006.01)
*G06F 12/12* (2006.01)
*G06F 12/08* (2006.01)

(52) U.S. Cl.
CPC .......... *G06F 12/122* (2013.01); *G06F 12/0866* (2013.01); *G06F 12/123* (2013.01); *G06F 12/126* (2013.01)

(58) Field of Classification Search
None
See application file for complete search history.

(56) References Cited

U.S. PATENT DOCUMENTS

| | | | | |
|---|---|---|---|---|
| 6,701,393 | B1 | 3/2004 | Kemeny et al. | |
| 6,948,032 | B2 | 9/2005 | Kadambi et al. | |
| 7,457,926 | B2 | 11/2008 | Shen et al. | |
| 8,117,396 | B1 * | 2/2012 | Fair et al. | 711/133 |
| 8,176,255 | B2 | 5/2012 | Knebel | |
| 2002/0056025 | A1 * | 5/2002 | Qiu et al. | 711/133 |
| 2008/0086599 | A1 | 4/2008 | Maron et al. | |
| 2010/0306467 | A1 * | 12/2010 | Pruthi et al. | 711/114 |
| 2012/0096250 | A1 | 4/2012 | Aloni et al. | |
| 2012/0117328 | A1 | 5/2012 | McKean et al. | |
| 2013/0097387 | A1 * | 4/2013 | Sanchez Martin et al. | 711/129 |

FOREIGN PATENT DOCUMENTS

EP 0841619 A2 5/1998

OTHER PUBLICATIONS

U.S. Appl. No. 13/761,608, filed Feb. 7, 2013, entitled "Tiered Caching Using Single Level Cell and Multi-Level Cell Flash Technology."

* cited by examiner

*Primary Examiner* — Reginald Bragdon
*Assistant Examiner* — Edward Wang

(57) ABSTRACT

A cache device for the caching of data and specifically for the identification of stale data or a thrashing event within the cache device is described. Further a cache device for the prioritization of cached data in the cache device during a thrashing event as well as stale cached data in the cache device are described. Methods associated with the use of the caching device for the caching of data and for the identification of data in a thrashing event or the identification of stale cached data are also described.

7 Claims, 6 Drawing Sheets

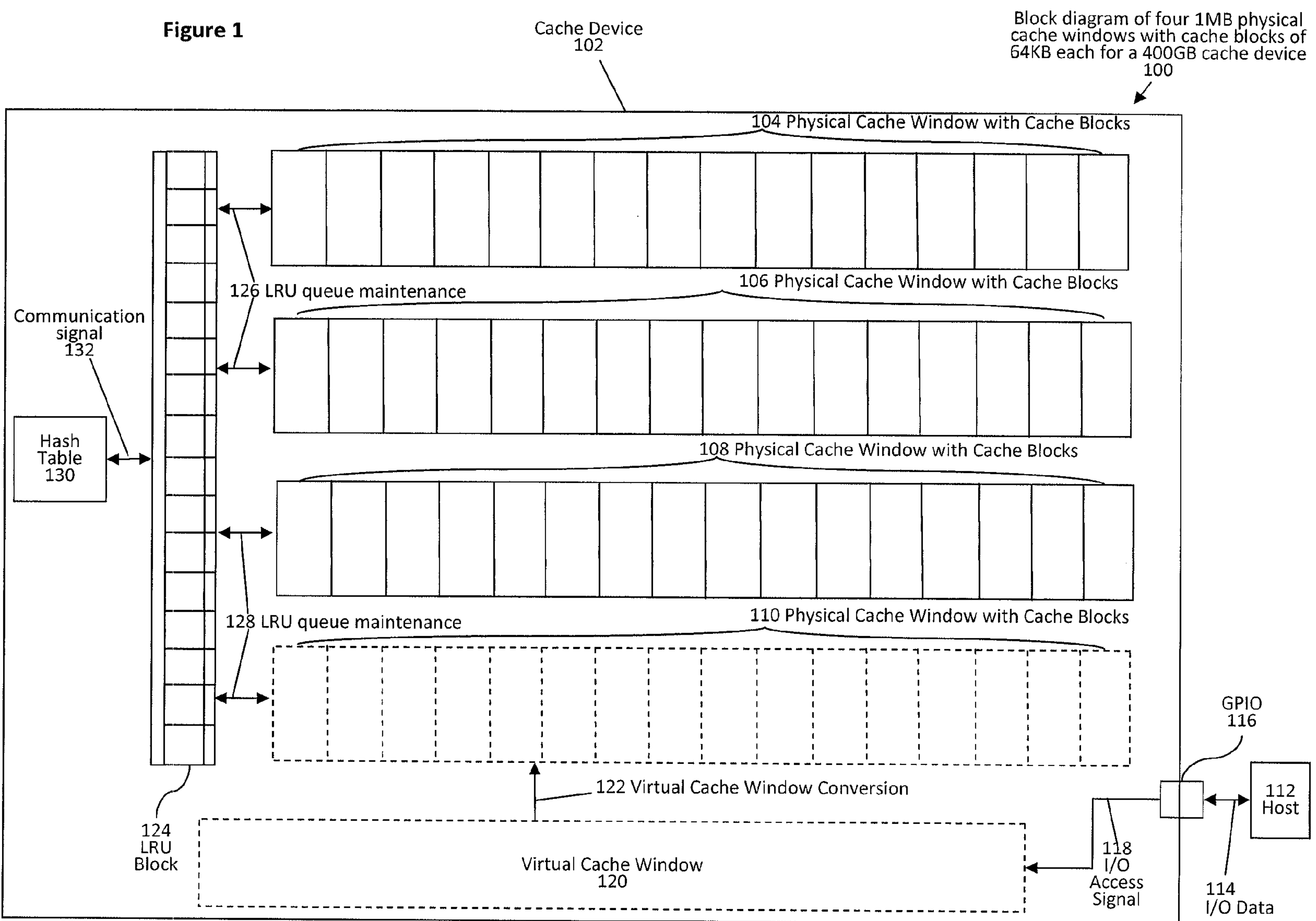
Figure 1
Cache Device
102
Block diagram of four 1MB physical cache windows with cache blocks of 64KB each for a 400GB cache device
100
104 Physical Cache Window with Cache Blocks
126 LRU queue maintenance
106 Physical Cache Window with Cache Blocks
Communication
signal
132
Hash
Table
130
108 Physical Cache Window with Cache Blocks
128 LRU queue maintenance
110 Physical Cache Window with Cache Blocks
GPIO
116
122 Virtual Cache Window Conversion
112
Host
124
LRU
Block
Virtual Cache Window
120
118
I/O
Access
Signal
114
I/O Data

METHOD TO THROTTLE RATE OF DATA CACHING FOR IMPROVED I/O PERFORMANCE

FIELD

The present disclosure relates generally to computer systems and more particularly to storage systems.

BACKGROUND

Storage devices or cache devices allow data to be stored in a system to allow for faster and more efficient access to the data in the future. As data is stored in a storage or cache device, if the data is not accessed over a period of time the data will become stale. In some cases, data that will need to be cached in a cache device will be larger than the capacity for the cache device. In these cases, the cache device may begin to cache data as well as remove older data, which will need to be recached, creating a continuous cycle of caching and discarding the same data is called thrashing.

SUMMARY

An embodiment of the present invention may comprise a method for storing data onto a cache device when the amount of hot data exceeds the cache device's storage capacity comprising: monitoring references to data stored in one or more physical cache windows in the cache device using a least recently used queue block; prioritizing the data stored in the one or more physical cache windows to a least recently used queue in the least recently used queue block; promoting the one or more physical cache windows to a higher priority least recently used queue in the least recently used queue block based on the number of the references to the data in the one or more physical cache windows during a certain time period; demoting the one or more physical cache windows to a lower priority least recently used queue in the least recently used queue block when the data is not accessed during a certain time period; and monitoring the number of demoted physical cache windows in the cache device using one or more counters in the least recently used queue block.

An embodiment of the present invention may further comprise a cache device comprising: at least one virtual cache window; at least one physical cache window; a least recently used queue block in communication with the at least one physical cache window; and a hash table in communication with the least recently used queue block and wherein the least recently used queue block comprises at least two least recently used queues, at least two counters and one global counter.

BRIEF DESCRIPTION OF THE DRAWINGS

FIG. 1 is a block diagram of four physical cache windows with cache blocks in a cache device.

DETAILED DESCRIPTION OF THE EMBODIMENTS

Figure 2:
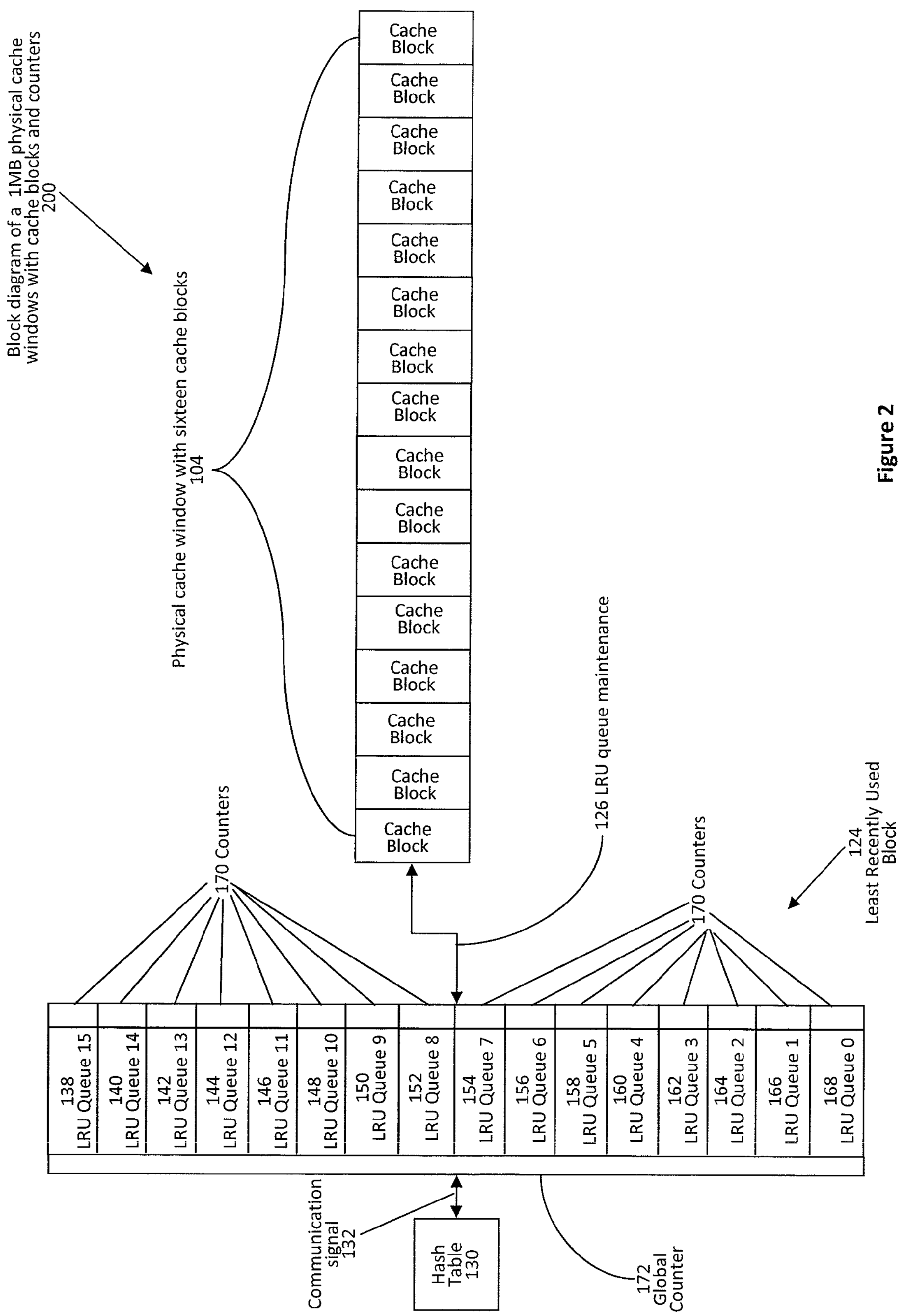
FIG. 2 is a block diagram of a close-up view of a 1 MB physical cache window with cache blocks in communication with a least recently used queue block with least recently used queues and counters.

FIG. 1 is a block diagram of a flash storage device with 1 MB physical cache windows for the storage of cache data 100 and specifically for the identification of a thrashing event as well as the prioritization of storage cache data in the cache device during a thrashing event or when stale cached data is present in the cache device. In the example shown in FIG. 1, the flash storage device or cache device 102, such as a flash storage device with 100 MB capacity (the capacity shown in FIG. 1 is 400 GB), is divided into data storage regions called cache windows (CW) 104, 106, 108 and 110 1 MB in size. The cache device 102 has 100 physical cache windows 104, 106, 108 and 110 1 MB each in size for a total of 100 MB of storage space. All the physical cache windows 104, 106, 108 and 110 are initialized within the cache device 102 using a logical block addressing scheme and inserted into a pool of physical cache windows 104, 106, 108 and 110 with free storage space available for storing cacheable data from the host or hard disk 112. Each physical cache window 104, 106, 108 and 110 is further broken into sixteen (16) cache blocks, where each cache block is 64 KB in size. Cache blocks may be 4 KB, 8 KB, 16 KB, 32 KB, 64 KB and 128 KB in size with a default value of 64 KB.

Referring to FIG. 1, the cache device 102 receives input/out data 114 for storage from a hard disk or host 112 where the input/output data 114 is transmitted from the host 112 through a general purpose input/output port 116. Before the input/out data 114 is transmitted to a physical cache window 104, 106, 108 and 110 for storage, the system of the present disclosure will determine if a physical cache window 104, 106, 108 and 110 is available for storage. All input/output data 114 is transmitted into the cache device 102 by means of an input/output (I/O) access signal 118. By means of the input/output (I/O) access signal 118, the data 114 is initially stored in a region of the cache device 102 allocated as the virtual cache window 120, with accesses to the data 114 tracked and monitored by the virtual cache window 120. When input/output data 114 is repeatedly accessed or referenced while located in the virtual cache window 120, usually three references or until the predetermined threshold of references is met, the input/out data 114 in the virtual cache window 120 is converted 122 to one physical cache window 104, 106, 108 and 110 and into a specific region of the flash storage address within the physical cache window 104, 106, 108 and 110. While the virtual cache window 120 is freed of the input/output data 114, the physical cache window 104, 106, 108 and 110 is filled with the input/output data 114 from virtual cache window 120. Once the input/out data 114 has been allocated to and stored in a physical cache window 104, 106, 108 and 110, the physical cache windows 104, 106, 108 and 110 are inserted into and monitored by a least recently used (LRU) queue within the least recently used queue block 124. By means of a LRU queue maintenance signal 126 and 128, the least recently used queue block 124 tracks the references and access (input and read requests) to the input/output data 114 stored in the physical cache window 104, 106, 108 and 110 using a series of least recently used queues (not shown in FIG. 1) which will be discussed further later.

In the example cache device 102 shown in FIG. 1, four physical cache windows 104, 106, 108 and 110 of the one hundred (100) physical cache windows of the cache device 102 are illustrated but any number of physical cache windows can be used for data storage. Therefore, while this descriptive example has four physical cache windows 104, 106, 108 and 110, it should be understood that this description is applicable to any such apparatus with other numbers of physical cache windows, as will be understood by one skilled in the art, once they understand the principles of this invention.

Further, in the example cache device 102 shown in FIG. 1, sixteen (16) cache blocks are illustrated per physical cache window but any number of cache blocks can be used for data storage within the physical cache window, depending on the size of the physical cache window. Therefore, while this descriptive example has sixteen cache blocks, it should be understood that this description is applicable to any such apparatus with other numbers of cache blocks, as will be understood by one skilled in the art, once they understand the principles of this invention.

By way of example, the system of the present disclosure has one (1) million configurable tracking headers or virtual cache windows 120 and each tracking header or virtual cache window 120 has 1 MB of virtual data space. The virtual cache windows 120 are memory data structures within the flash storage device or cache device 102. These virtual cache windows 120 are used to track 1 MB regions of hard disk space or host 112, where the 1 MB region of the host 112 has not been cached to a physical cache window 104, 106, 108, and 110.

In an example of the present disclosure, if a particular 1 MB region of the hard drive space or host 112 that is tracked by a virtual cache window 120 is accessed three or more times, the input/out data of the region is determined to be hot and a physical cache window structure 104, 106, 108 and 110 is taken from the least recently used queue within the least recently used queue block 124. The hot input/out data 1 MB region in the hard disk or host 112 is copied and stored onto the specific region of the flash storage 102 address space represented by the 1 MB physical cache window structure 104, 106, 108 and 110. Future input/output data to the hot 1 MB hard disk 112 region will now be redirected to the specific region of the cached data of the physical cache window 104, 106, 108 and 110 of the faster cache device or flash storage device 102 rather than the slower hard disk or host 112.

Upon receiving a reference to data 114 from host 112 applications, a hash table 130 maintains a list of the physical cache windows 104, 106, 108 *and* 110 and where data 114 has been stored or allocated in the cache device 102. The hash table 130 is in communication by means of a communication signal 132 with the least recently used queue block 124. The least recently used queue block 124 maintains and monitors references to both virtual cache windows 120 and physical cache window 104, 106, 108 and 110 data structures. Based on the location of the region of data in the host 112, the hash table 130 is searched by the least recently used queue block 124 to determine if any type of cache window, whether a virtual cache window 120 or physical cache window 104, 106, 108 and 110 is already allocated to track that 1 MB region of data. If a physical cache window is found to be already tracking and storing data from the 1 MB region of data, and as will be discussed in reference to FIG. 2, the appropriate counters (not shown in FIG. 1) associated with the physical cache window are updated and increased by one (1). If the hard disk or host region 112 is not already being tracked in a physical cache window 104, 106, 108 and 110, a new virtual cache window 120 is allocated to track the new region of interest.

If the input/output data 114 hits a 1 MB region has never been accessed before, a virtual cache window 120 is allocated from a free list of virtual cache windows and the number of accesses to the data of the region is set to one (1). Each access in the virtual cache window 120 is tracked and if during a given input/output data period, which is measured by the number of inputs/outputs and not time, the virtual cache window 120 access reaches a threshold value (usually three references to the data in the virtual cache window) and the input/output data 114 in the virtual cache window 120 is transferred to a physical cache window 104, 106, 108 and 110. The virtual cache window 120 is now free to receive new input/output data 114. 100191 FIG. 2 provides a close up example of a physical cache window and a least recently used queue block 200. As shown in FIG. 2, a least recently used queue block 124 is in communication with a hash table 130 by means of a communication signal 132. The least recently used queue block 124 is made up of least recently used queues (LRU queue) 138, 140, 142, 144, 146, 148, 150, 152, 154, 156, 158, 160, 162, 164, 166 to 168 (138 to 168) along with counters 170 and a global counter 172. As shown in FIG. 2, sixteen least recently used queues 138 to 168, sixteen counters 170 and one global counter 172 monitor and track by means of a LRU queue maintenance signal 126 the data usage and accesses to the data stored in the physical cache windows 104. While sixteen least recently used queues and sixteen counters are shown in FIG. 2, it should be understood that this description is applicable to any such apparatus with other numbers of least recently used queues and other numbers of counters, as will be understood by one skilled in the art, once they understand the principles of this invention.

Depending on how often data in a physical cache window 104 is accessed, the physical cache window 104 will be moved to a higher or lower least recently used queue 138 to 168. The movement of the physical cache window 104 to the higher priority least recently used queue 138 to 168 in the least recently used block 124 is called a promotion of the physical cache window 104. The movement of a physical cache window 104 to a lower priority least recently used queue 138 to 168 is called a demotion.

As further shown in FIG. 2, the least recently used queues 138 to 168 of the least recently used block 124 are assigned a priority queue numbered 0 to 15 with 0 having the lowest priority and 15 having the highest priority. Each least recently used queue 138 to 168 maintains a least recently used list and a counter 170 monitors how many demoted physical cache windows 104 reside in the least recently used queue 138 to 168 (the demotion of a physical cache window 104 will be discussed later) and which demoted physical cache windows 104, as will be discussed, can be re-used for new allocated physical cache windows 104. A global counter 172 exists across all least recently used queues 138 to 168.

Any newly allocated physical cache window 104 is added to the end of the lowest priority least recently used queue 138 to 168, in FIG. 2 this would be LRU Queue 0 168. Upon sufficient references to data at a specific region within a physical cache window 104, such as three references to data, the physical cache window 104 is promoted and moved to a higher priority least recently used queue, such as from LRU Queue 0 168 to LRU Queue 1 166. The physical cache window 104 is demoted to the previous priority least recently used queue when the data stored in the physical cache window 104 is not accessed during a certain pre-defined time period. On demotion, the physical cache window 104 is added to the next lowest least recently used queue, such as from LRU Queue 1 166 to LRU Queue 0 168. A global counter 172 is used to keep track of the total number of demoted physical cache windows 104 in the least recently used queue block 124. At any given point in time, based on communication with the hash table 130, the counters 170 and global counter 172, the least recently used queue block 124 knows how many physical cache windows 104 are allocated and how many physical cache windows 104 are actually demoted. A counter 170 associated with a specific least recently used queue 138 to 168 will not account if the physical cache window 104 is being demoted through several least recently used queues 138 to 168. Such a physical cache window 104 is still counted as a demotion, however the counters 170 are adjusted such that each least recently used counter 170 will represent the current number of demoted physical cache windows residing in the least recently used queue block 124. The global counter 172 will remain the same when a physical cache window 104 is demoted through several least recently used queues 138 to 168. A flag is used on physical cache windows 104 when a physical cache window 104 has been demoted in order to differentiate promoted and demoted physical cache windows in the same least recently used queue 138 to 168. The flag will be reset when a physical cache window 104 is promoted.

On promotion of a physical cache window 104 to a higher priority least recently used queues 138 to 168, the counter 170 in communication with the least recently used queue 138 to 168 is decremented. So, if the rate of promotion of physical cache windows 104 equals the demotion rate of the physical cache windows 104 this rate suggests the workload of the cache device 102 is experiencing thrashing, which will be discussed later. If the demotion rate of the physical cache windows 104 is high, this is an indication of the presence of stale data, which will also be discussed later.

Using an exponential time decay described below, physical cache windows 104 are moved from higher priority least recently used queues 138 to 168 to lower priority least recently used queues 138 to 168. When a physical cache window 104 is demoted from a higher least recently used queue 138 to 168 to the next priority least recently used queue 138 to 168, individual counters 170, in communication with a corresponding to each least recently used queue 138 to 168 monitor the movement of the physical cache window 104 and where a physical cache window 104 is demoted the counters are bumped by one (1) value. If a physical cache window is demoted from the LRU Queue 2 164 to LRU Queue 1 166, then the counters are bumped by a factor of two (2). Similarly when a physical cache window 104 is moved from LRU Queue 14 140 to LRU Queue 15 138, the counters 170 are bumped up by fifteen (15) for the physical cache window 104. When these demoted physical cache windows 104 are promoted, appropriate values for the counters 170 are adjusted, such as when a physical cache window 104 is promoted from the LRU Queue 14 to LRU Queue 15 in the least recently used queue, the counters 170 are subtracted by fifteen (15) for the physical cache window 104.

As newer data is considered hot based upon repeated references to the data, data is copied onto the cache device 102 and stored in the physical cache windows 104. If, according to the hash table 130 in communication with the least recently used block 124, no physical cache windows 104 are available for allocation, then the least recently used queue block 124 will identify the physical cache window 104 where the data in the physical cache window 104 has not been accessed for the longest duration, based on the information received by the least recently used queues 138 to 168.

Over a period of time, certain data allocated and stored in a physical cache window 104, which used to be hot, could potentially become stale due to limited or no access to it from host applications. Though the data is cached, through the use of demotions, the data's physical cache windows 104 will eventually be located in the lowest priority least recently used queue, LRU Queue 0 168 in FIG. 2. As new data becomes hot and needs to be cached, if no space is available in the physical cache windows 104, based on the least recently used queue priority 138 to 168, the stale data is replaced from the physical cache window 104 located in the lowest priority least recently used queue LRU Queue 0 168 in FIG. 2. To identify the data for removal, the least recently used queue block 124, using the counters 170 in communication with the least recently used queues 138 to 168, identifies the flagged demoted physical cache window 104 located in the lowest priority least recently used queue, LRU Queue 0 168 in FIG. 2. The data in the identified physical cache window 104 is then discarded. Newer hot data 114 from the host 112 is now targeted and directed to the virtual cache window at the back end of the cache device 102. The least recently used queue block 124 begins to reuse the physical cache windows 104 where data was recently discarded for newer hot data where the physical cache window 104 was previously located in the lowest priority LRU queue 0 168.

Smaller adjacent physical cache windows 104 may be grouped to form a large group (256K, 512K, or 1 MB). This grouping of physical cache windows promotes faster data caching of adjacent windows without having the data reach the hard disk drive (HDD) for the minimum criteria. This grouping is needed when smaller physical cache window sizes are needed such as 128 KB to allow for faster ramp up to a 1 MB region. When a physical cache window 104 of 128 KB size is considered hot, then the least recently used block 124 will automatically consider the adjacent physical cache windows within 1 MB boundary of the smaller physical cache window to be hot as well. This is done to have faster cache ramp up when caching is first enabled. The system of the present disclosure allows for physical cache window sizes to be 128 KB, 512 KB, 1 MB, 2 MB and 4 MB, with a default value of 1 MB.

Over a period of time, certain cached data, which used to be hot will potentially become stale due to limited or no access to the data from the host 112 or applications. Though the data is cached in a physical cache window 104, the data's physical cache window 104 will be located in the lowest priority least recently used queue, LRU 0 168 in FIG. 2 in the least recently used queue block 124. If the system identifies that no additional space is available in the physical cache window 104 based on the least recently used queue block 124, the stale data will be replaced by newer hot data. Stale data can be defined as understanding how much of hot data is actively being accessed over a period of time. The least recently used queue block 124 and the least recently used queues or buckets in the block 124 can be used to achieve this. Whenever a physical cache window is demoted due to lesser accesses to its cache data, counters assigned to the least recently used queues or buckets will be maintained to understand how many cache windows are currently in a demoted state. As shown in FIG. 2, there are two sets of counters, one counter 170 per LRU queue or bucket 138 to 168, and a global counter 172. The physical cache window 104, which is currently being demoted, is marked as such with a special flag. Whenever a demoted physical cache window 104 is promoted again due to new accesses, the outstanding demoted counters are adjusted accordingly, and the flag will be reset. At any given time, if the total demoted physical cache windows is not equal to zero, this indicates that some amount of stale data is present. If there exists any occupied physical cache windows or if stale data exists in a physical cache window, then the requirement for a data region (Virtual Cache Window 120 of FIG. 1) to be considered as hot will depend on the state of currently allocated physical cache windows 104. If there are any free physical cache windows 104 to be used or stale (demoted) physical cache windows 104 on the least recently used queue block 124, then the threshold will be set to three (3). Therefore, the requirement to consider data in a virtual cache window 120 as cacheable will require three times of the default accesses count. (i.e. nine read accesses to its respective region). In case there are no free physical cache windows 104 or demoted physical cache windows 104, then the required threshold will be higher, for example, three times the default value or nine references or accesses to the data.

In some cases, hot data will become larger than the capacity for the cache device 102. When a physical cache window 104, 106, 108 and 110 is chosen for the caching of the data, certain data in a physical cache window, as identified by the lower priority least recently used queue 138 to 168 of the least recently used queue block 124 will need to be discarded. Due to the size of the data, the discarded data quickly becomes hot again, creating a cycle of new data and discarded data called thrashing.

In order to compensate for the system being in a thrashing mode, the system may deal with the caching of data in two ways. In the first method, the data is replaced from the physical cache windows in the lowest priority least recently used queue and subsequently stored in a new physical cache window at a faster rate. In the second method, the number of references required to identify data as hot is amended, such as from three (3) references to nine (9) references, therefore it takes nine references for data to be allocated or stored in a physical cache window from the lowest priority least recently used queue for the storage of the new hot data. In some instances, the system may even stop all allocation or storage of data to physical cache windows while the system is in thrashing mode.

Figure 3:
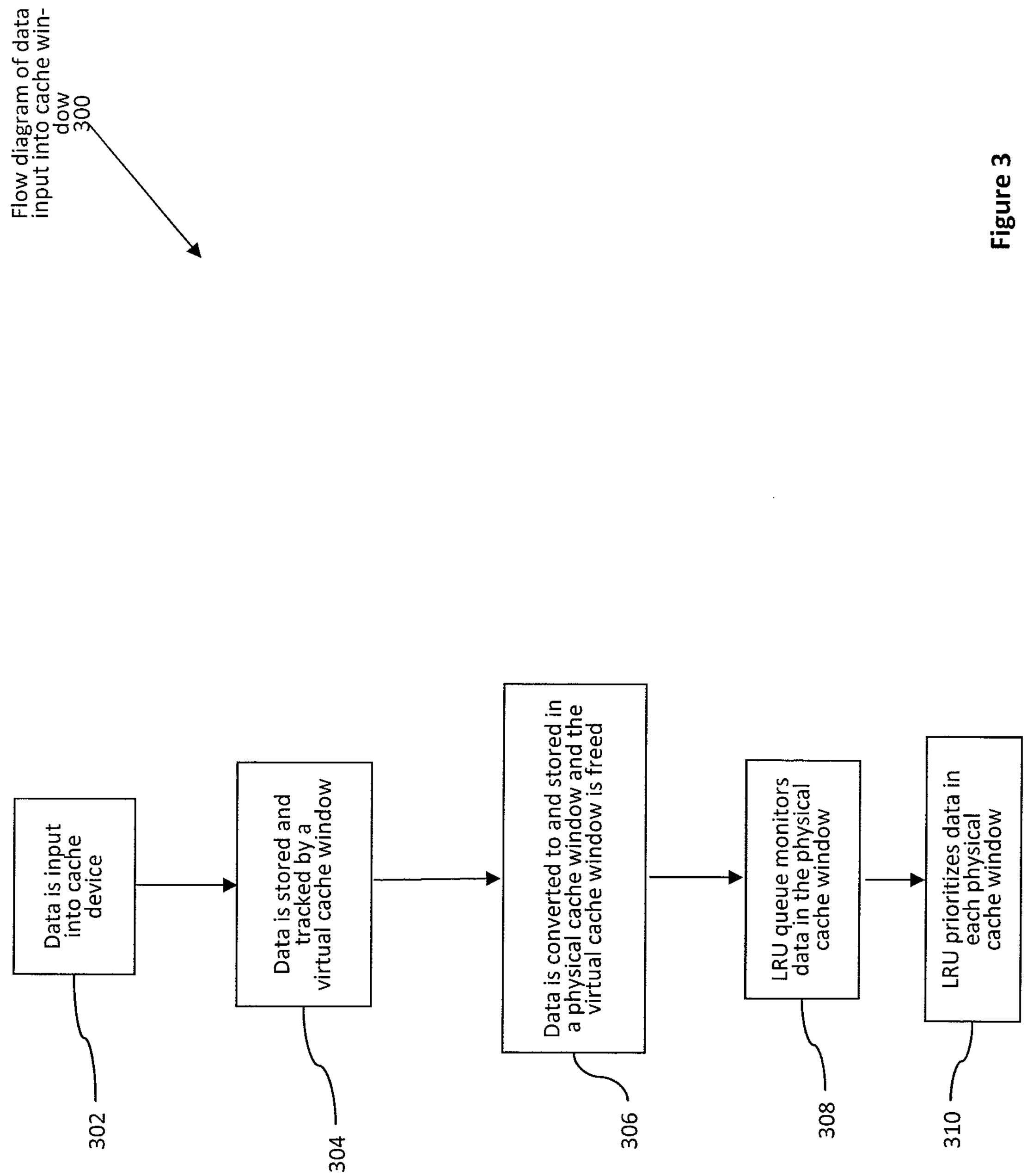
FIG. 3 is a flow diagram of data input to a physical cache window.

FIG. 3 provides a flow diagram of the caching of data input into the cache device of the present disclosure 300. In step 302, data is input into the cache device. In step 304, the data is allocated to and tracked by a virtual cache window or background region of the cache device. In step 306, when data in the virtual cache window is repeatedly accessed by an external host, usually at least three references to the data, the data in the virtual cache window is converted or transmitted to a physical cache window where the data is assigned and stored in a physical cache window. Once the data from the virtual cache window has been removed from the virtual cache window, the virtual cache window is free to allow new data to be allocated to and tracked in the virtual cache window. In step 308, a least recently used queue (LRU) block, comprising sixteen least recently used queues or buckets is maintained and monitors the access to the data across all physical cache windows. In step 310, the least recently used queue (LRU) block prioritizes the data stored in the physical cache windows depending on how often data in a physical cache window is accessed and/or when the data was last accessed.

Figure 4:
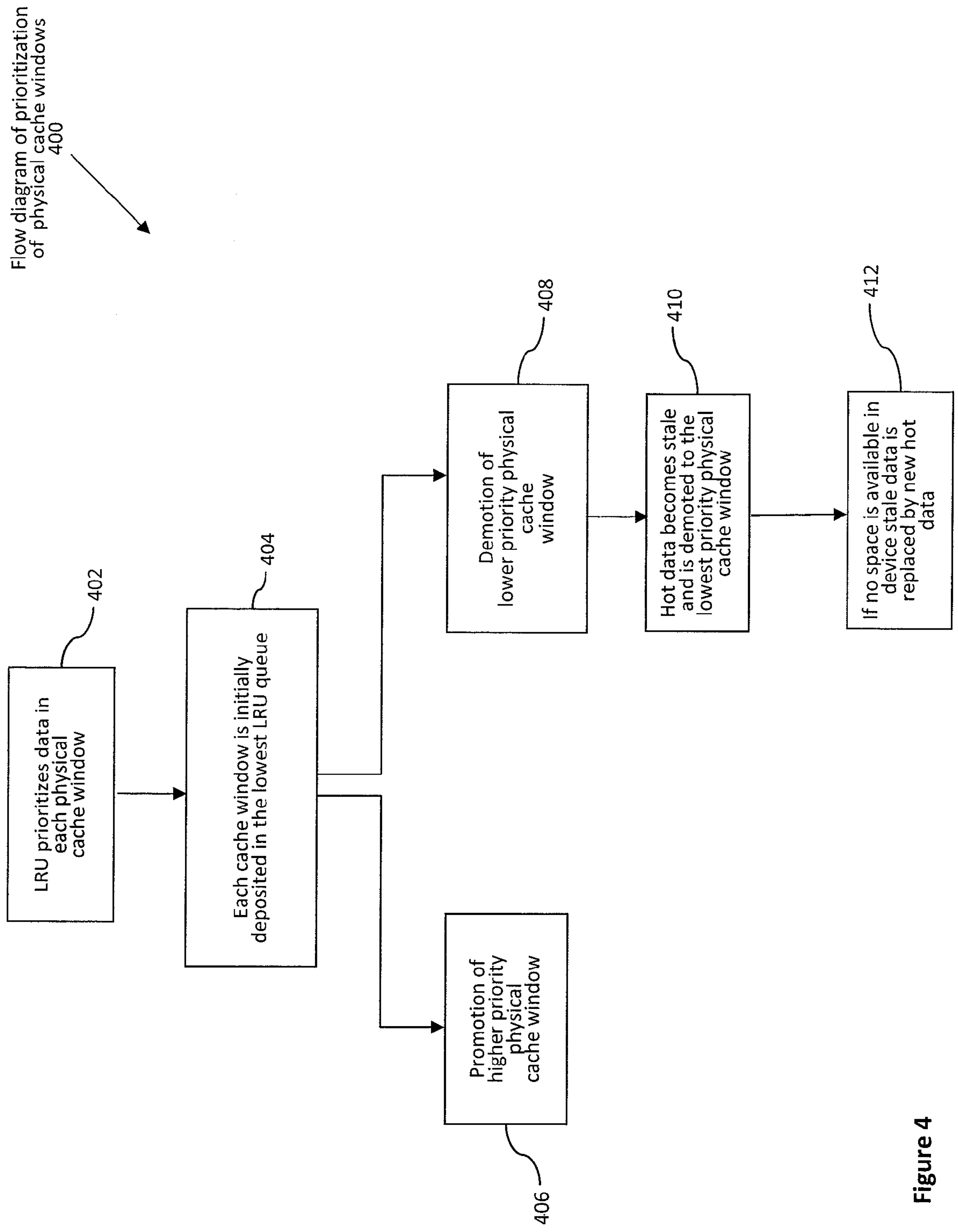
FIG. 4 is a flow diagram for prioritization of physical cache windows.

As shown in FIG. 4, a flow diagram is provided showing the prioritization of the data in a physical cache window 400. In step 402, the least recently used queue block prioritizes each physical cache window. In step 404, all physical cache windows are inserted into least recently used queues (LRU queues) of the least recently used queue block, so that the physical cache windows may be reused as the cache capacity of the cache driver or cache device is much smaller than the actual physical or hard disk capacity. Rather than maintaining one single least recently used queue or bucket for all the physical cache windows, the present disclosure provides sixteen least recently used queues for all of the physical cache windows. Each least recently used queue or list represents a LRU bucket, where each least recently used queue is prioritized with a priority ranging from low (0) to high (15). Initially all physical cache windows are inserted into the least recently used queue with the lowest priority, in this case LRU queue 0. In step 406, upon receiving a certain amount of references or accesses to the cached data in a physical cache window, the physical cache window is moved from the lowest priority least recently used queue to a higher priority list. The movement of physical cache window from a lower least recently used queue to a higher least recently used queue is called a promotion. In step 408, when a physical cache window has not been accessed for certain amount of time, the least recently used queue block identifies the data in the physical cache window is not being accessed and the physical cache window is moved from the current least recently used queue to a lower least recently used queue. The movement of the physical cache window from a higher least recently used queue to a lower least recently used queue is called a demotion. To have a dynamic rate of demotion of physical cache windows rather than a default or high requirements, a demotion weight factor is used when demoting physical cache windows. When a physical cache window is demoted from highest to the next priority physical cache window, a counter associated with each least recently used priority queue associated with the demoted physical cache window are bumped by one (1) value and a flag is attached to the physical cache window. If a physical cache window is demoted by two least recently used priority queues, then the counters associated with the least recently used priority queues are bumped or increased by a factor of two (2). Similarly, when a physical cache window is moved from 15th to 14th least recently used queues, the counters are increased by fifteen (15) for each physical cache window. When these demoted physical cache windows are promoted, appropriate values are adjusted. In step 410, over a period of time, certain data, which used to be hot, could potentially become stale due to limited or no access to it from applications. Though the data is cached, through the use of demotions, the data's physical cache windows are eventually located in the lowest priority least recently used queue. In step 412, as new data becomes hot and needs to be cached, if no space is available in the physical cache windows, based on the least recently used queue priority, the stale data is removed from the physical cache window located in the lowest priority least recently used queue. The system reuses physical cache windows for newer hot data from the lowest priority least recently used queue.

Figure 5:
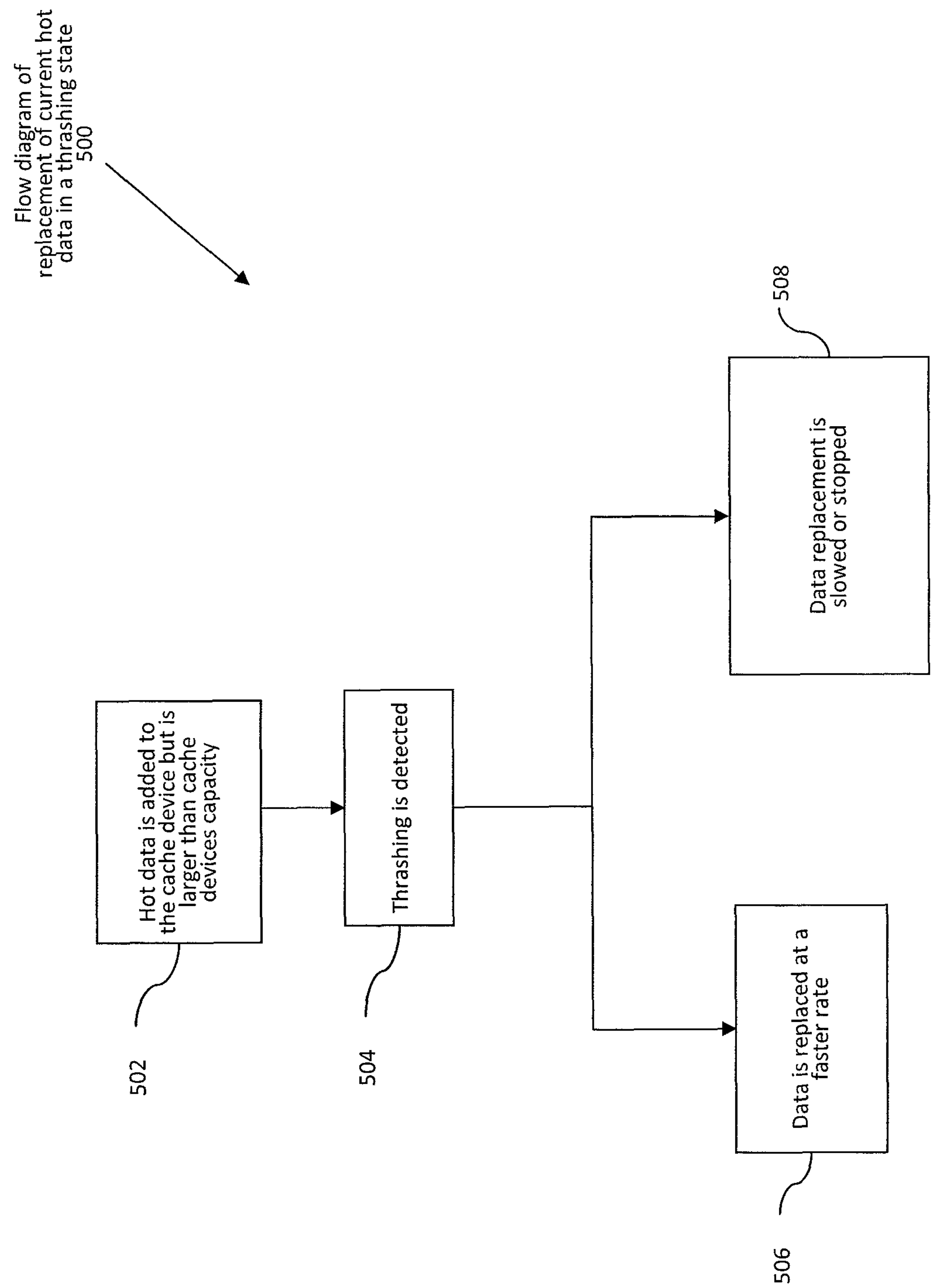
FIG. 5 is a flow diagram showing the method of replacement of hot data when the cache device is in a thrashing state.

In FIG. 5, a flow diagram is provided showing the steps for identifying if the system of the present disclosure is in thrashing mode 500. In step 502, hot data is added to the cache device but the new data is larger than the cache device's caching capacity. In step 504, if there are no unused physical cache windows available for caching data and no stale data is available for removal from the physical cache window in the lowest priority least recently used queue, then the system is in thrashing mode. In step 506, in order to compensate for the system being in a thrashing mode, the data is removed from the physical cache windows in the lowest priority least recently used queue and subsequently stored in a new physical cache window at a faster rate. In step 508, an alternative method to deal with the thrashing mode, the number of references required to identify data as hot is amended, an example may be from three (3) references to nine (9) references, therefore is takes nine references for data from the system to be stored in a physical cache window from the lowest priority least recently used queue for the storage of the new hot data. In some instances, the system may even stop all allocation or storage of data to physical cache windows while the system is in thrashing mode.

Figure 6:
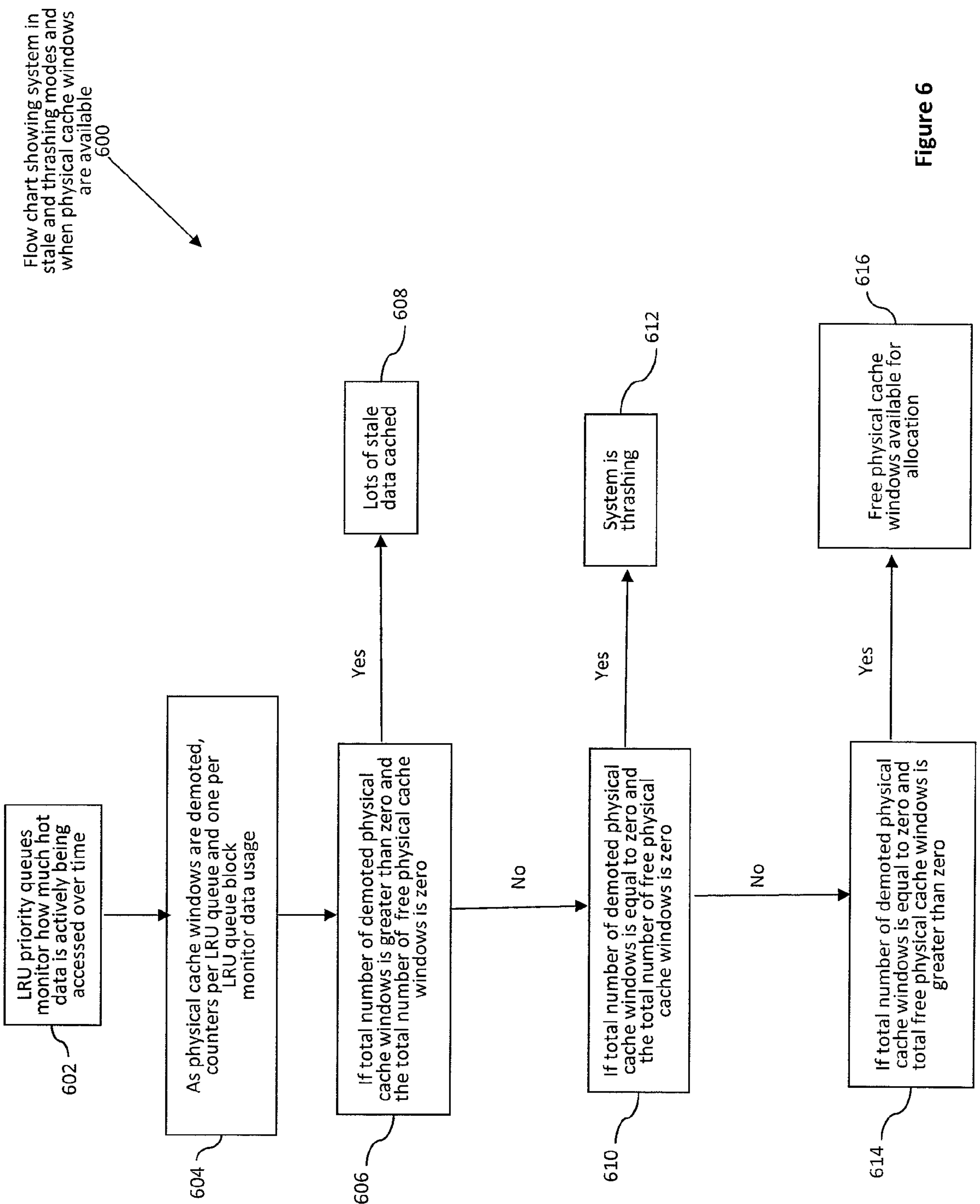
FIG. 6 is a flow diagram showing how to determine if the cache device has stale data, is in a thrashing state or if physical cache windows are available for storage.

As shown in FIG. 6, a flow diagram is provided to show the logic to detect whether there is any stale cached data in the system or if thrashing is occurring, 600. In step 602, the least recently used priority queues monitor how much data stored in each physical cache window is actively being accessed over time. In step 604, physical cache windows are demoted in the least recently used queues as data becomes a lower priority based upon the monitoring of data usage by counters in communication with the least recently used priority queues. One counter is allocated per least recently used queue, with an additional queue allocated for all sixteen least recently used queues in the least recently used queue block. As discussed above, when a physical cache window is demoted from the highest to the next priority physical cache window, the counters associated with each least recently used priority queue associated with the demoted physical cache window are bumped by one (1) value. If a physical cache window is demoted by two least recently used priority queues, then the counters associated with the least recently used priority queues are bumped by a factor of two (2) and least recently used queue indicates which least recently used queue is accounting the current location of the demoted physical cache window. However, the global counter remains the same. Similarly, when a physical cache window is moved from 14th to 15th least recently used queues, the counters are bumped up by fifteen (15) and will then indicate the queue accounting for the current location of the physical cache window. This calculation provides an understanding as to whether the cache windows are partially filled, if stale cached data exists, or if the system is in a thrashing mode and therefore achieving a throttling of caching rate. In step 606, based on the weight factor, if the total number of demoted physical cache windows is greater than zero and the total number of free physical cache windows is equal to zero, then as shown in step 608, there is stale data cached in the physical cache windows. In step 610, if the total number of demoted physical cache windows is equal to zero and the total number of free physical cache windows is equal to zero, then as shown in step 612, the system is in thrashing mode. In step 614, if the total number of demoted physical cache windows is equal to zero and the total number of free physical cache windows is greater than zero, then as shown in step 616, the system has free cache windows available for allocation.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storing data onto a cache device when the amount of hot data exceeds the cache device's storage capacity comprising:

monitoring references to data stored in one or more physical cache windows in a cache device by utilizing a least recently used queue block;

prioritizing said data stored in said one or more physical cache windows to a least recently used queue in said least recently used queue block;

promoting said one or more physical cache windows to a higher priority least recently used queue in said least recently used queue block based on the number of said references to said data in said one or more physical cache windows during a certain time period;

demoting said one or more physical cache windows to a lower priority least recently used queue in said least recently used queue block when said data is not accessed during a certain time period;

monitoring the number of demoted physical cache windows in said cache device using one or more counters in said least recently used queue block;

searching a hash table in communication with said least recently used queue;

identifying said cache device is thrashing when the total number of said demoted physical cache windows is equal to zero and a total number of free physical cache windows is equal to zero; and increasing the number of said references required to store said data in said one or more demoted physical cache windows, wherein said increasing in said number of said references is greater than three references.

2. The method claim 1, further comprising:

identifying that no free physical cache windows are available in said cache device;

replacing data from said one or more demoted physical cache windows in said lowest priority least recently used queue;

storing new data to said one or more demoted physical cache windows; and tracking references to said new data stored in said one or more demoted physical cache windows utilizing said least recently used queue block.

3. The method of claim 2, further comprising:

tracking data in a host using a virtual cache window;

monitoring the number of references to said data in said host using said virtual cache window; and storing said data from said host onto said cache device represented by said one or more physical cache windows based upon said data from said host receiving a number of said references during a certain time period.

4. The method of claim 1, further comprising:

identifying said cache device has stale data when the total number of said one or more demoted physical cache windows is greater than zero and the total number of said free physical cache windows is equal to zero.

5. The method of claim 1, further comprising identifying when said cache device has free physical cache windows when the total number of said one or more demoted cache windows is equal to zero and the total number of said free cache windows is greater than zero.

6. A cache device for the caching of data comprising:

at least one virtual cache window;

at least one physical cache window;

a least recently used queue block in communication with said at least one physical cache window, wherein said least recently used queue block comprises at least two least recently used queues, at least two counters and one global counter; and a hash table in communication with said least recently used queue block, wherein said at least one physical cache window is prioritized to said at least two least recently used queues in said least recently used queue block based on the number of references to data stored in said at least one physical cache window, wherein said hash table maintains a list of the location of said data stored in said at least one physical cache window as well as the location of said at least one physical cache window, wherein said least recently used queue block monitors the number of references to said data stored in said at least one physical cache window, wherein said at least two counters and one global counter monitor demotion of said at least one physical cache window in communication with said least recently used queue block.

7. The cache device of claim 6, wherein said at least one physical cache window further comprise at least one cache block for storage of said data.

* * * * *